US006811324B2

(12) United States Patent
Morse

(10) Patent No.: US 6,811,324 B2
(45) Date of Patent: Nov. 2, 2004

(54) METHOD AND APPARATUS FOR INCORPORATING A LOW CONTRAST INTERFACE AND A HIGH CONTRAST INTERFACE INTO AN OPTICAL DEVICE

(75) Inventor: Michael T. Morse, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 19 days.

(21) Appl. No.: 10/336,102

(22) Filed: Jan. 3, 2003

(65) Prior Publication Data

US 2003/0183826 A1 Oct. 2, 2003

Related U.S. Application Data

(62) Division of application No. 10/112,627, filed on Mar. 29, 2002, now Pat. No. 6,649,990.

(51) Int. Cl.[7] .............................. G02B 6/00; G02B 6/36
(52) U.S. Cl. .......................................... 385/88; 257/431
(58) Field of Search .............................. 385/31, 39–43, 385/88–92, 147, 1–4, 8–13, 27–28; 257/31.32, 92, 430, 431; 372/45, 46

(56) References Cited

U.S. PATENT DOCUMENTS

| 4,596,998 | A |   | 6/1986  | Krimmel                   |
|-----------|---|---|---------|---------------------------|
| 4,887,877 | A | * | 12/1989 | Inoue et al. ...... 359/108|
| 5,434,434 | A | * | 7/1995  | Kasahara et al. ... 257/84 |
| 5,625,729 | A | * | 4/1997  | Brown .............. 385/31 |
| 5,859,464 | A |   | 1/1999  | Hollricher et al.         |
| 5,987,046 | A | * | 11/1999 | Kobayashi et al. ... 372/45|
| 6,052,213 | A |   | 4/2000  | Burt et al.               |
| 6,060,743 | A |   | 5/2000  | Sugiyama et al.           |
| 6,118,908 | A |   | 9/2000  | Bischel et al.            |
| 6,185,033 | B1|   | 2/2001  | Bosc et al.               |
| 6,238,943 | B1| * | 5/2001  | Kobayashi et al. .... 438/31 |
| 6,252,714 | B1|   | 6/2001  | Guenther et al.           |
| 6,321,011 | B2| * | 11/2001 | Deacon .............. 385/50 |
| 6,393,169 | B1| * | 5/2002  | Paniccia et al. ..... 385/14 |
| 6,504,180 | B1| * | 1/2003  | Heremans et al. ..... 257/98 |
| 6,525,872 | B1| * | 2/2003  | Ziari et al. ...... 359/341.3 |
| 6,587,605 | B2| * | 7/2003  | Paniccia et al. ..... 385/14 |

(List continued on next page.)

FOREIGN PATENT DOCUMENTS

JP          02002-022457 A      1/2002

OTHER PUBLICATIONS

Graoui, H., et al., "Sige Device Architectures Synthesised By Local Area Ge+ Implantation—Structural And Electrical Characterization," *IEEE*, (2000), pp. 38–41.

Yukari, I., et al., "Sige–On–Insulator Substrate Created By Low–Energy Oxygen Implantation Into A Thick Pseudomorphic Sige Grown On Si(100)," *Proceedings 1998 IEEE International SOI Conference*, (Oct., 1998), pp. 51–52.

Hemment, P.L.F., et al., "Ge+ Ion Implantation—A Competing Technology?" *Journal of Crystal Growth* 157, (1995), pp. 147–160.

*Primary Examiner*—Akm Enayet Ullah
(74) *Attorney, Agent, or Firm*—Blakely, Sokoloff, Taylor & Zafman LLP

(57) ABSTRACT

Methods and apparatuses for incorporating low contrast and high contrast interfaces in optical devices. In one embodiment an insulator is disposed proximate to a plurality of regions of a semiconductor including regions through which an optical beam is directed. High contrast interfaces are defined between the semiconductor and the insulator. Low contrast interfaces are defined between a doped region and the semiconductor. The optical beam is directed through the doped region from one of the plurality of semiconductor regions to another of the plurality of regions with relatively low loss. Optical coupling or evanescent coupling depending on an incident angle of the optical beam relative to the low contrast interface may occur through the doped region and low contrast interface.

5 Claims, 13 Drawing Sheets

U.S. PATENT DOCUMENTS

| | | | |
|---|---|---|---|
| 6,611,636 B2 * | 8/2003 | Deliwala | 385/14 |
| 6,671,443 B2 * | 12/2003 | Deliwala | 385/125 |
| 2002/0064359 A1 | 5/2002 | Ouellet et al. | |
| 2002/0090192 A1 | 7/2002 | O'Brien et al. | |
| 2002/0097771 A1 | 7/2002 | Hwang et al. | |
| 2002/0164118 A1 | 11/2002 | Paddon et al. | |
| 2002/0191916 A1 | 12/2002 | Frish et al. | |
| 2003/0016913 A1 | 1/2003 | Brophy et al. | |
| 2003/0231686 A1 | 12/2003 | Liu | |

\* cited by examiner

METHOD AND APPARATUS FOR INCORPORATING A LOW CONTRAST INTERFACE AND A HIGH CONTRAST INTERFACE INTO AN OPTICAL DEVICE

CROSS REFERENCE TO RELATED APPLICATIONS

This application is a divisional of, and claims priority from, U.S. patent application Ser. No. 10/112,627, filed Mar. 29, 2002, now U.S. Pat. No. 6,649,990 and currently pending.

BACKGROUND OF THE INVENTION

1. Field of the Invention

The present invention relates generally to optical devices and, more specifically, the present invention relates to incorporating low contrast interfaces and high contrast interfaces in optical devices.

2. Background Information

The need for fast and efficient optical-based technologies is increasing as Internet data traffic growth rate is overtaking voice traffic pushing the need for optical communications. Commonly used optical devices include diffraction gratings, thin-film filters, fiber Bragg gratings, and arrayed-waveguide gratings.

Inherent properties of materials may limit the manufacture and use of many optical devices. As a result, producing such optical devices can often be highly expensive and time consuming. Common problems include high loss environments or a combination of materials that offer little control over the optical properties of the device.

BRIEF DESCRIPTION OF THE DRAWINGS

The present invention is illustrated by way of example and not limitation in the accompanying figures.

DETAILED DESCRIPTION

Figure 1A:
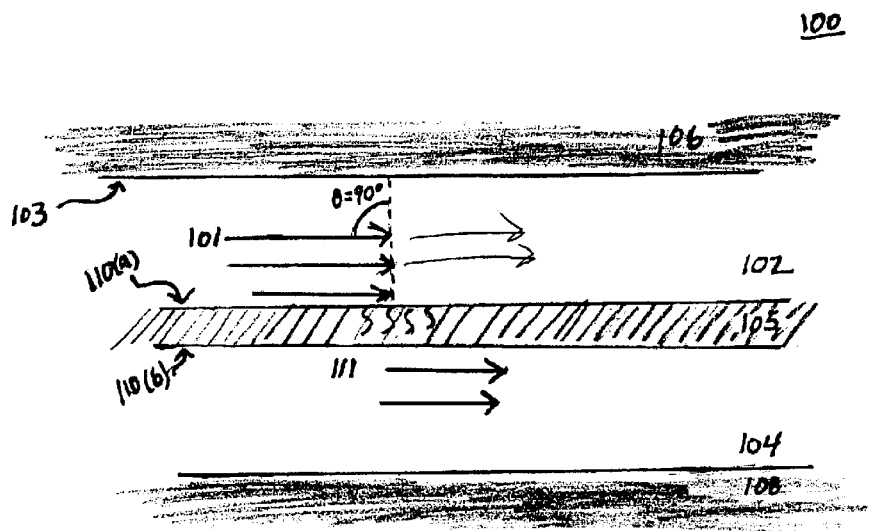
FIG. 1A is a diagram illustrating an embodiment of an optical device including low and high contrast interfaces in accordance with the teachings of the present invention.

Methods and apparatuses for incorporating low contrast and high contrast interfaces in optical devices are disclosed. In the following description numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment. Furthermore, the particular features, structures or characteristics may be combined in any suitable manner in one or more embodiments.

In one embodiment of the present invention, an optical device having low and high contrast interfaces is provided. Embodiments of the optical device offer fine control and low optical loss environments. In one embodiment, a high contrast interface is provided with an insulator material next to a core semiconductor material, where the insulator and the semiconductor material have substantially different refractive indexes from each other. The interface between the two materials thus defines the high contrast interface. For example, the core semiconductor material of a waveguide may include silicon having an index of refraction of 3.5, while the surrounding cladding includes an insulator, such as an oxide, having an index of refraction of 1.5. In general, a high contrast interface may correspond to a range of differences in indices of approximately $\Delta n > 0.5$. It is appreciated that other value ranges for $\Delta n$ may be utilized in accordance with the teachings of the present invention and that $\Delta n > 0.5$ is provided herewith for explanation purposes. Thus, in the example above, the change in refractive indexes or $\Delta n$, is 2, generally considered as a high contrast interface. Such a system has benefits according to embodiments of the present invention. For example, because the core semiconductor material has a high refractive index relative to the cladding, light tends to stay in the core while the insulator serves as a low loss cladding region surrounding the core. The ability to more tightly confine light to the core allows an optical system to be made in more compact form according to embodiments of the present invention. Limitations of high contrast interfaces may include a high coupling loss and scattering caused by roughness.

Accordingly, embodiments of the present invention also include low contrast interfaces. Such an interface may be defined at the interface between a region having a refractive index slightly different from an adjacent or proximately disposed region. In one embodiment, the change in refractive indexes may be in the range of a $\Delta n$ of approximately $10^{-1}$–$10^{-3}$. As stated, embodiments of the present invention provide a combination of both low and high contrast interfaces in the same optical device. The low contrast interface offers a lower level of reflectivity, low loss, and fine control for an optical device while the high contrast interfaces offer the benefits as described above. As will be discussed, examples of optical devices where both high contrast interfaces and low contrast indexes are helpful include, but are not limited to, Bragg gratings, ring resonators, directional couplers or other suitable devices.

In one embodiment of the present invention, an optical device having a low contrast interface system is incorporated into a high contrast interface system. As will be discussed, a method of making the same is also provided. In one embodiment a semiconductor material, such as for example silicon, is doped with a dopant material, such as for example, germanium in a high contrast interface system to provide a doped region and a low contrast interface between the semiconductor material and the doped region.

FIG. 1A is a diagram illustrating an embodiment of an optical device including low and high contrast interfaces in accordance with the teachings of the present invention. In FIG. 1A an optical device 100 includes insulator regions 106 and 108 disposed proximate to a plurality of semiconductor regions 102 and 104 through which an optical beam 101 is directed. Insulator regions 106 and 108 have a refractive index substantially different from the refractive index of semiconductor regions 102 and 104. An interface between insulator region 106 and semiconductor region 102 thus defines a high contrast interface 103. In one embodiment, semiconductor regions 102 and 104 include silicon having an index of refraction of approximately $n_{Si}$=3.5 and insulator regions 106 and 108 include an oxide having an index of refraction of approximately $n_{Ox}$=1.5. Thus, in one embodiment, the difference in refractive indices is approximately $\Delta n = n_{Si} - n_{Ox} = 2$, which is considered a high contrast interface.

In one embodiment a doped region 105 is disposed between semiconductor regions 102 and 104. Doped region 105 has a refractive index slightly different than the refractive index of semiconductor regions 102 and 104. In general, a low contrast interface may correspond to a range of differences in indices of approximately $\Delta n = 10^{-1} - 10^{-3}$. For example, in one embodiment, doped region 105 may have an index of refraction of $n_d$=3.55. Since silicon has an index of refraction of 3.5, the change in refractive indexes $\Delta n_{eff} = n_d - n_{Si} = 3.55 - 3.5 = 0.05$, defining low contrast interfaces 110(a) and 110(b) between doped region 105 and semiconductor regions 102 and 104, respectively. It is appreciated that other value ranges for $\Delta n$ may be utilized in accordance with the teachings of the present invention and that $10^{-1}-10^{-3}$ is provided herewith for explanation purposes.

Because semiconductor region 102 has a relatively high refractive index relative to insulator region 106, beam 101 stays confined to semiconductor region 102 at high contrast interface 103. As mentioned previously, one of the many advantages to a high contrast interface includes an ability to more tightly confine light to the semiconductor region allowing the optical device to be made in more compact form.

In one embodiment, optical device 100 allows evanescent coupling to occur depending on an incident angle of optical beam 101 relative to low contrast interface 110(a). For purposes of the disclosure, an incident angle θ is the angle that an optical beam makes with an imaginary line perpendicular to a surface or interface at the point of incidence. When the angle of incidence is less than the critical angle, (where the critical angle is defined as $\theta_c = \sin^{-1}(n_d/n_{Si})$ where $n_{Si} > n_d$), light is generally optically coupled to be directed between semiconductor regions 102 and 104 through low contrast interfaces 110(a) and 110(b) through doped region 105 with low loss in accordance with the teachings of the present invention.

Even if the angle of incidence is greater than the critical angle $\theta_c$, however, some light is still optically coupled between semiconductor regions 102 and 104 though low contrast interfaces 110(a) and 110(b) and doped region 105 via evanescent coupling. Since the refractive indices $n_{Si}$ and $n_d$ are so close in value, $n_d/n_{Si}$ approaches 1 and the critical angle $\theta_c$ is relatively large. Since $\Delta n$ is relatively small in the illustrated embodiment, an optical beam even substantially parallel to the low contrast interface is evanescently coupled through doped region 105 to semiconductor region 104. For example, in the embodiment illustrated in FIG. 1A, optical beam 101 is directed through semiconductor region 102 in a direction substantially parallel to low contrast interface 110(a), or with an incident angle θ substantially equal to 90 degrees which is greater than the critical angle $\theta_c$. Nevertheless, evanescent coupling is provided through doped region 105 such that at least a portion of optical beam 111 is directed through semiconductor region 104 as a result. In sum, at least a portion of optical beam 101 is directed through doped region 105 between semiconductor regions 102 and 104 with optical coupling or evanescent coupling, depending on the incident angle with low loss of the optical beam 101 relative to the low contrast interface 110(a) or 110(b).

In one embodiment, doped region 105 is designed to have a thickness to allow evanescent coupling to semiconductor region 104 from semiconductor region 102 to occur through doped region 105. Thus, in an embodiment, evanescent coupling may occur when the incident angle θ of optical beam 101 to low contrast interface 110(a) is less than or equal to 90 degrees.

Figure 1B:
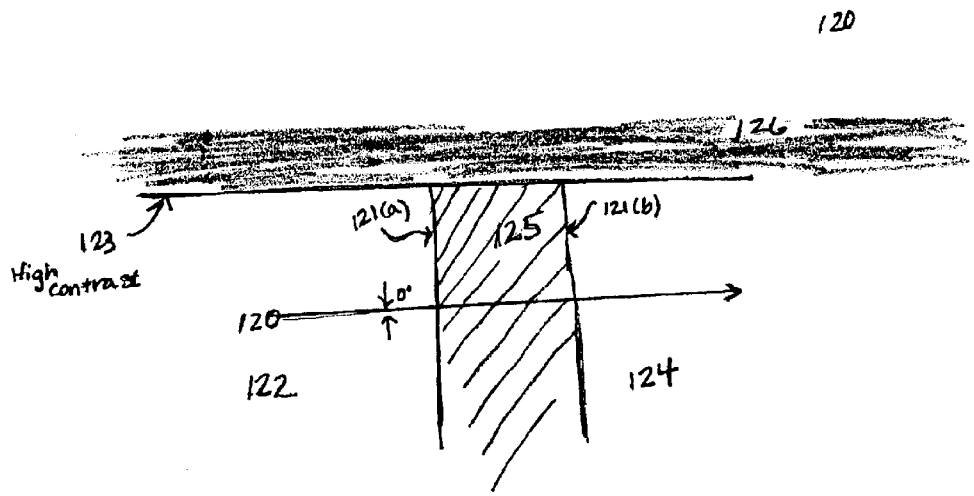
FIG. 1B is a diagram illustrating another embodiment of an optical device including low and high contrast interfaces in accordance with the teachings of the present invention.

FIG. 1B is a diagram illustrating another embodiment of an optical device including low and high contrast interfaces in accordance with the teachings of the present invention. In one embodiment an insulator region 126 is disposed proximate to a plurality of semiconductor regions 122 and 124 through which an optical beam 120 is directed. In one embodiment, insulator region 126 includes oxide and semiconductor regions 122 and 124 include silicon. Insulator region 126 has a refractive index $n_{Ox}$ substantially different from the refractive index $n_{Si}$ of semiconductor regions 122 and 124. An interface between insulator region 126 and semiconductor regions 122 and 124 thus defines a high contrast interface 123. Because semiconductor region 122 has a relatively high refractive index relative to insulator region 126, optical beam 120 tends to remain confined in semiconductor region 122 at high contrast interface 123. In one embodiment a doped region 125 is disposed in between semiconductor regions 122 and 124. Doped region 125 has a refractive index slightly different than the refractive index of semiconductor regions 122 and 124, defining low contrast interfaces 121(a) and 121(b) between doped region 125 and semiconductor regions 122 and 124. Thus, in one embodiment, optical beam 120, may travel from semiconductor region 122 through doped region 125 to semiconductor region 124 where a small effective refractive index difference is provided at interfaces 121(a) and 121(b).

In one embodiment, the incident angle of beam 120 relative to low contrast interface 121(a) is greater than or equal to 0 degrees, and beam 120 may travel through doped region 125 to reach semiconductor region 124. In one embodiment, the refractive index of doped region 125 is carefully controlled such that the reflectivity at low contrast interfaces 121(a) and 121(b) is carefully controlled. As will be discussed, the refractive index of doped region 125 is determined by including a controlled concentration of a dopant material in doped region 125. In one embodiment, the dopant material provides a controlled refractive index for doped region 125 as well as low optical loss for optical beam 120 when directed through doped region 125. In one embodiment the optical device described above is similar to an embodiment of a Bragg grating that will be discussed below in reference to FIG. 2.

In the above examples discussed in FIGS. 1A and 1B it is appreciated that silicon is an example material provided for explanation purposes and that other semiconductor materials including for example Indium Phosphide (InP), Gallium Arsenide (GaAs) or other III–V semiconductor materials may be utilized in accordance with the teachings of the present invention. Furthermore, in one embodiment, the insulator regions may be an oxide such as silicon dioxide ($SiO_2$). In another embodiment, the insulator regions may be a nitride or other suitable insulator.

Figure 2:
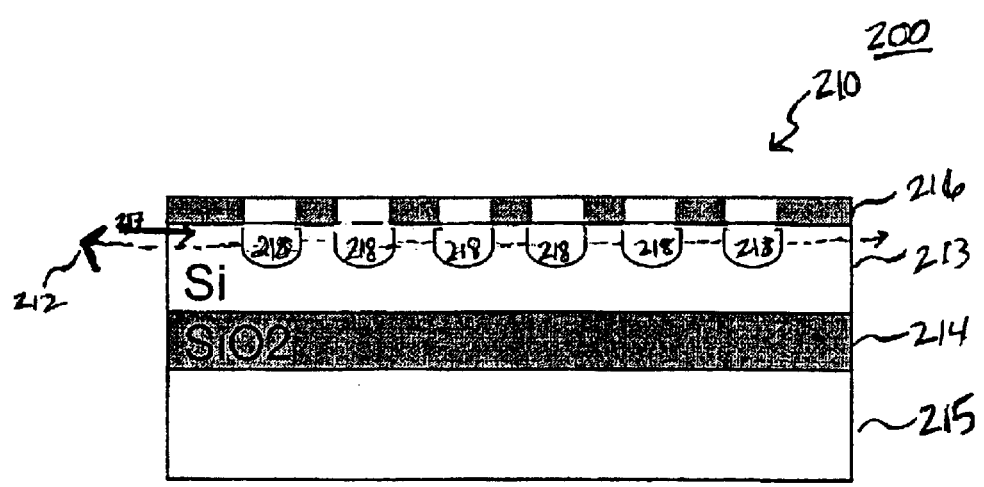
FIG. 2 is a diagram illustrating one embodiment of an optical device with low and high contrast interfaces included in a Bragg grating in accordance with the teachings of the present invention.

FIG. 2 is a diagram illustrating a cross section of one embodiment of an optical device with low and high contrast interfaces included in a waveguide Bragg grating in accordance with the teachings of the present invention. In one embodiment, waveguide Bragg grating 200 includes a plurality of doped regions 218 each similar to doped region 125 of FIG. 1B. Accordingly, low contrast interfaces are provided along the waveguide at each interface between doped regions 218 and semiconductor region 213. In the illustrated embodiment a semiconductor-based waveguide Bragg grating 200 is disposed on a wafer 210. In one embodiment, wafer 210 is a silicon-on-insulator (SOI) wafer having high contrast interfaces defined between the semiconductor regions and the insulator regions. As illustrated in FIG. 2, wafer 210 includes an insulator region 216. Below insulator region 216 is a semiconductor region 213 and semiconductor region 215 in accordance with the teachings of the present invention. Between regions 213 and 215 there is a buried insulator layer 214 that integrally bonds semiconductor layers 213 and 215. In one embodiment, semiconductor layers 213 and 215 include silicon and insulators 214 and 216 may be an oxide, such as silicon dioxide ($SiO_2$).

In one embodiment, the low contrast interfaces provided along the waveguide at each interface between doped regions 218 and semiconductor region 213 provide periodic or quasi-periodic perturbations in an effective index of refraction provided along an optical path. As a result, a multiple reflection of an optical beam 217 traveling along an optical path 212 occurs at the interfaces between semiconductor region 213 and the plurality of doped regions 218 along an optical path 212. In one embodiment, a Bragg reflection occurs at a particular or Bragg wavelength. Accordingly, the Bragg wavelength may be filtered or dropped from the optical beam 217.

Figure 3:
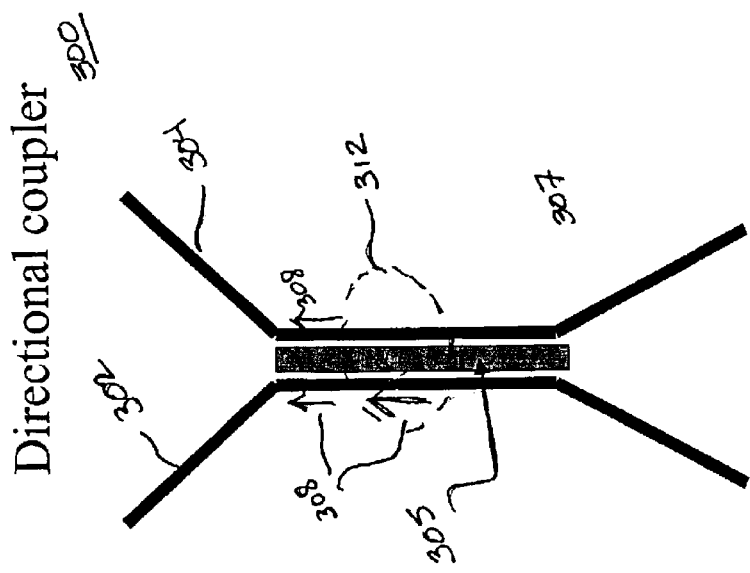
FIG. 3 is a diagram illustrating one embodiment of an optical device with low and high contrast interfaces included in a directional coupler in accordance with the teachings of the present invention.

FIG. 3 is a diagram illustrating another embodiment of an optical device with low and high contrast interfaces included in a 3 dB or directional coupler 300 in accordance with the teachings of the present invention. Directional coupler 300 includes two adjacent waveguides 302 and 304 and a doped region 305 disposed between waveguides 302 and 304 in accordance with the teachings of the present invention. In one embodiment, directional coupler 300 uses evanescent coupling to transfer a portion of optical beam 308 from waveguide 302 to waveguide 304. An area denoted by dotted lines 312 on directional coupler 300 corresponds to device 100 of FIG. 1A and its accompanying discussion of the effect of the low contrast interfaces and high contrast interfaces included in the device.

Low contrast interfaces between doped region 305 and waveguides 302 and 304 allow evanescent coupling to occur in a high contrast environment. In a directional coupler in a high contrast only system, the two adjacent waveguides are placed very close together to allow some of the light to transfer between waveguides. However, in one embodiment of the present invention, including doped region 305 and low contrast interfaces between waveguides 302 and 304 permits evanescent coupling to occur without the need for waveguides 302 and 304 to be so close to one another, thus reducing strain on the manufacturing process.

Figure 4:
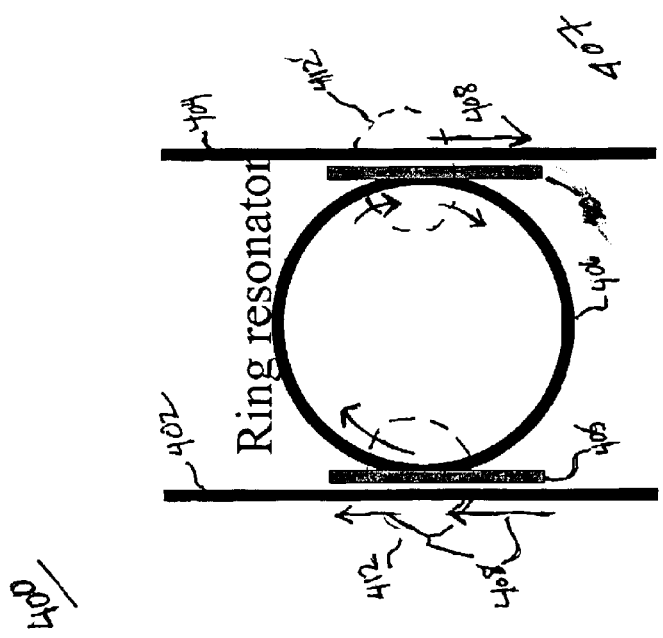
FIG. 4 is a diagram illustrating one embodiment of an optical device with low and high contrast interfaces included in a ring resonator in accordance with the teachings of the present invention.

FIG. 4 is a diagram illustrating yet another embodiment of an optical device with low and high contrast interfaces included in a ring resonator 400 in accordance with the teachings of the present invention. In one embodiment, ring resonator 400 includes waveguides 402 and 404 and a ring waveguide 406 included in an insulator region 407. Waveguides 402 and 404 and ring waveguide 406 include a semiconductor region. In one embodiment the semiconductor region includes silicon. On opposing sides of ring waveguide 406 and proximately disposed to each waveguide 402 and 404 are doped regions 405 and 410, respectively. In operation, an optical beam 408 travels along waveguide 402, light from beam 408 is then transferred via evanescent coupling from waveguide 402 via doped region 405 to ring waveguide 406. Regions 412 and 412' correspond to the discussion in relation to FIG. 1A and its accompanying discussion of the effect of the low contrast interfaces and high contrast interfaces included in the device. In one embodiment, ring waveguide 406 is designed to have one or more resonant wavelengths such that a resonated optical beam 406 having the one or more resonant wavelengths may be evanescently coupled to waveguide 408 at region 412' to waveguide 404. It is appreciated that although a ring resonator is specifically shown, in one embodiment, a disk resonator may also utilize low and high contrast interfaces in accordance with embodiments of the present invention.

It is appreciated that the example waveguide Bragg grating, the directional coupler and ring resonator are examples of optical devices provided herewith for explanation purposes. Other suitable devices with low and high contrast interfaces may be utilized in accordance with embodiments of the present invention. The doped regions of the example optical devices illustrated in FIGS. 2–4 above may in an embodiment include germanium. For example, the addition of germanium to silicon, resulting in an alloy, changes the refractive index of the material. The change in index is dependent on the amount of germanium and the strain of the material.

If strain is neglected, the index follows the form of:

$n(Si_{1-x}Ge_x)=n(Si)+ax$, where $a\approx 0.8$ for $\lambda\approx 1310–1550$ nm, and when strain is considered, follows the form:

$n(Si_{1-x}Ge_x)=n(Si)+ax+bx^2$, where $a\approx 0.3$ and $b\approx 0–0.3$

Therefore, small amounts of germanium can give a small change in the refractive index ($\Delta n \approx 10^{-3}$ to $10^{-1}$). Periodic changes in the refractive index profile can result in a Bragg grating such as for example, the embodiment illustrated in FIG. 2, which may be used for a static or tunable filter, or in part of a circulator or laser cavity, or other suitable device.

FIGS. 5A–5E illustrate an embodiment of a process involving ion implantation used to form an optical device such as for example, Bragg grating 200 illustrated in FIG. 2 in accordance with the teachings of the present invention. In one embodiment, a wafer 500 can include an SOI wafer. In one embodiment, wafer 500 includes high contrast interfaces with a top insulator region 504 above semiconductor region 506 and a buried insulator region 508 between semiconductor regions 506 and 510.

Figure 5A:
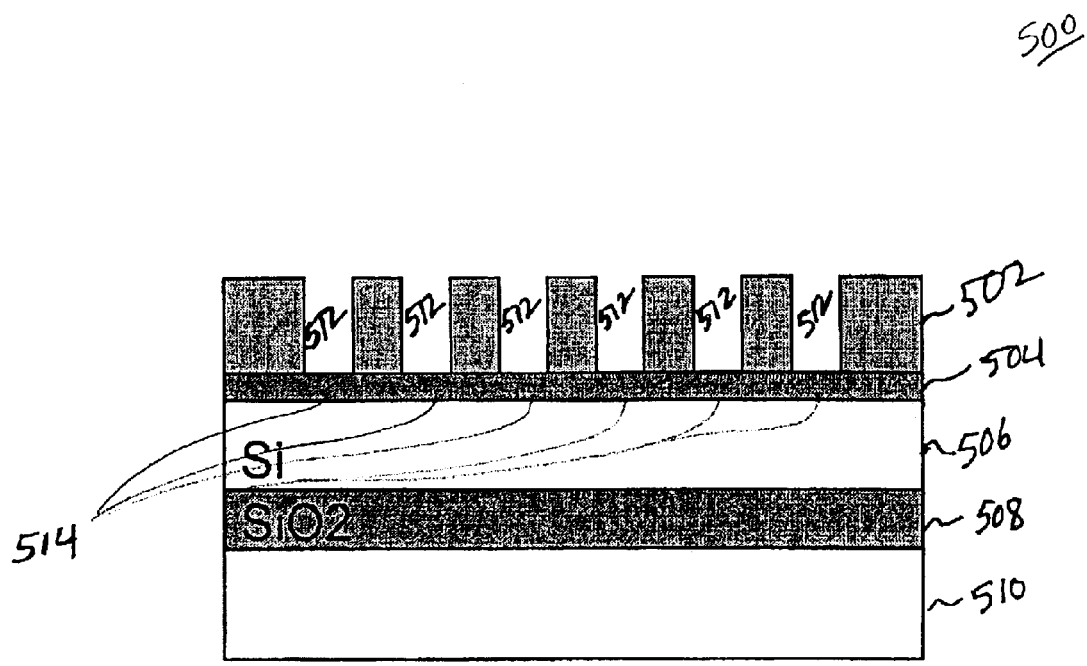
FIGS. 5A–5F illustrates an embodiment of a process involving ion implantation used to form an optical device such as the Bragg grating illustrated in FIG. 2 in accordance with the teachings of the present invention.

In FIG. 5A, a photoresist layer 502 has been deposited over insulator region 504. In one embodiment, each trench 512 corresponds to a doped region to be formed. In one embodiment, photoresist layer 502 has been deposited via a spin-on deposition process to define areas in which one or more doped regions will be formed to provide one or more low contrast interfaces. As shown in the depicted embodiment, photoresist layer 502 has been patterned and etched to create a series of periodic trenches 512 exposing discrete transverse sections of insulator region 504. In one embodiment, the patterning is done using standard lithographic techniques well known in the art, which typically comprise depositing layers of the correct materials on the device, applying a photoresist on the wafer, exposing the photoresist in areas to be added (light mask) or removed (dark mask) and then performing the appropriate etch. In one embodiment, a hard mask may also be used.

In one embodiment, the patterning is carried out using the lithographic process described above although other patterning processes such as ablation, ruling, or other techniques will be apparent to those skilled in the art. The etching can be carried out using either a dry or a wet process, and varieties of both wet and dry etching will be apparent to those skilled in the art and may be dependent upon the materials used for photoresist layer 502 and insulator region 504.

Figure 5B:
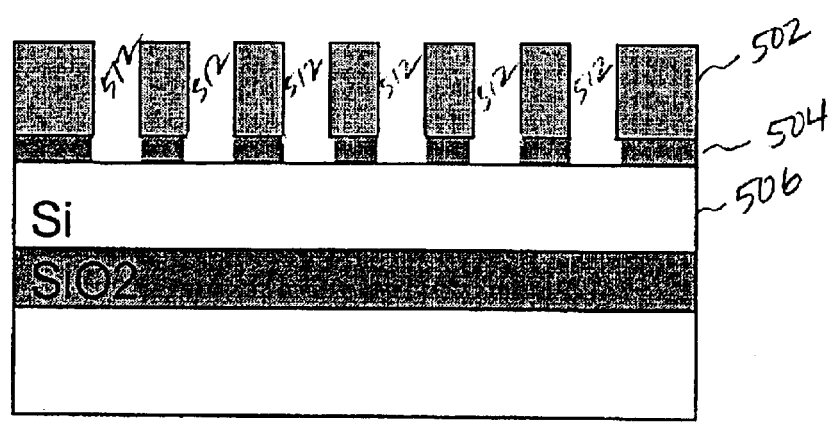

Next, as illustrated in FIG. 5B, exposed discrete transverse sections 514 of insulator region 504 have been removed by selective wet or dry etching. In one embodiment, discrete transverse sections of semiconductor region 506 are now exposed. Again, a lithographic patterning process may be used and wet or dry etching processes may be used. In one embodiment, insulator region 504 may serve as a hard mask for the implantation of Ge ions.

Figure 5C:
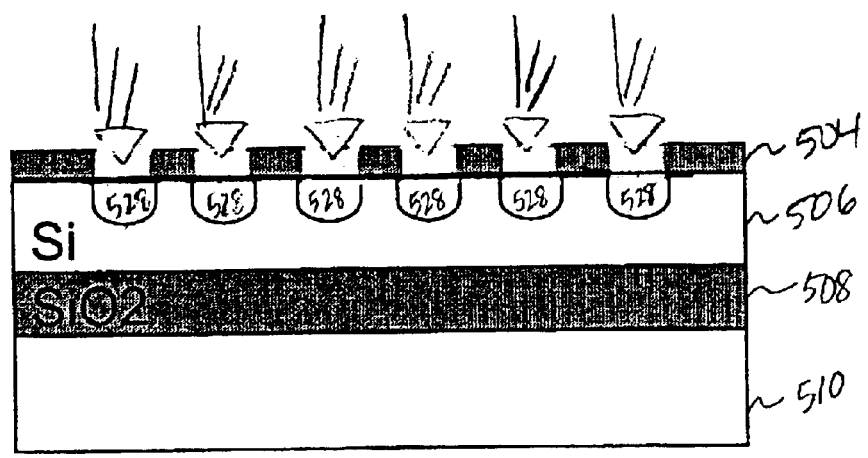

In FIG. 5C photoresist layer 502 has been removed and Ge ion implantation takes place with insulator region 504 as a hard mask. Although in this example, germanium is implanted, other materials, such as for example, aluminum, carbon, indium, phosphorus, boron or other suitable dopant material, or combinations thereof, may also be implanted. One advantage of $Si_{1-x}Ge_x$ is that it is an alloy, which means that a second phase of material will not precipitate out. Such an interface of a new phase could then serve as a scattering site, increasing the loss of the material. With the implantation of certain other ions, Boron, for instance, optical losses may be incurred because free carriers have been introduced.

Figure 5D:
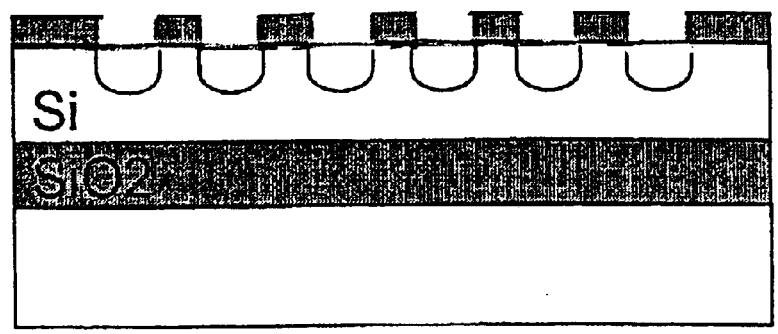

In one embodiment, ion implantation at multiple energies and angles is performed to give a uniform cross-section to the impurity distribution in traverse sections 528 of semiconductor region 506. Accordingly, multiple ion implantations can be performed in order to achieve a non-Gaussian dependent distribution of ions. In one embodiment, the germanium concentration employed to achieve a reasonable efficiency grating is approximately 0.5 to 5%, which roughly correlates to the same Δn that is used in fiber gratings based on silica. Higher concentrations may be used as long as considerations of strain, relaxation and loss are taken into account. Generally, only low concentrations such as 20% or more Ge are utilized for the optical device in accordance with the teachings of the present invention. Thus, as an example, energy of 400 keV and a dose of $3 \times 10^{16}/cm^2$ may result in an alloy with a peak concentration of 2.6% approximately 0.25 μm below the surface. At this energy, however, the implanted area is amorphized and solid phase epitaxy may be used to heal the damage. This stage of solid phase epitaxy (SPE) or regrowth is illustrated in FIG. 5D. The SPE is typically performed at low temperatures (<600° C.), although temperatures of 700° C.–900° C. or other suitable temperature ranges may be used.

Figure 5F:
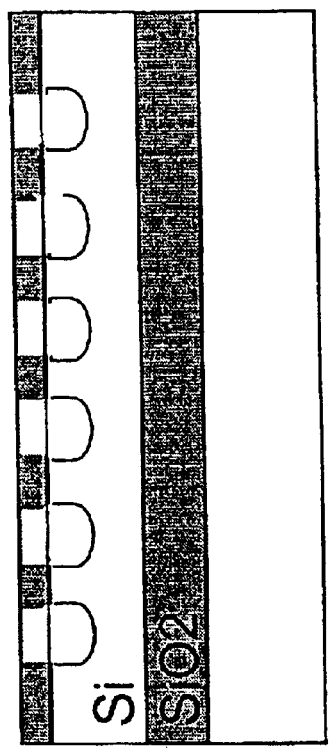
Figure 5E:
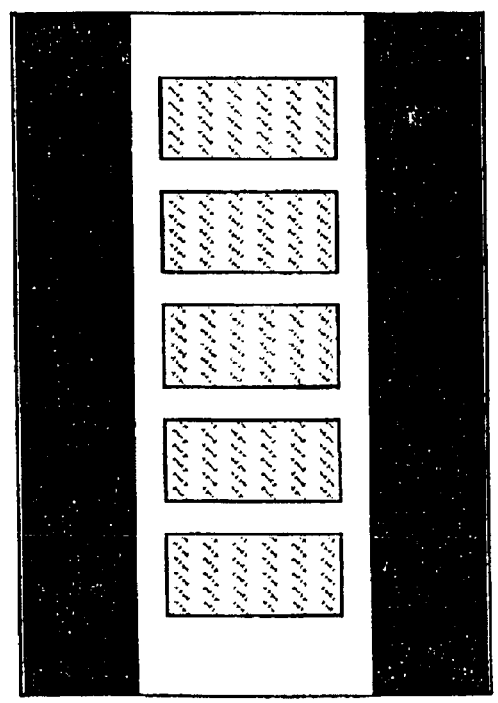

Finally, in FIGS. 5E and 5F a waveguide is patterned and etched in wafer 500. FIG. 5F is a cross-sectional view of the wafer after etching and FIG. 5E illustrates a top view of the wafer after etching. Again, a lithographic patterning process may be used and wet or dry etching processes may be used.

Figure 6A:
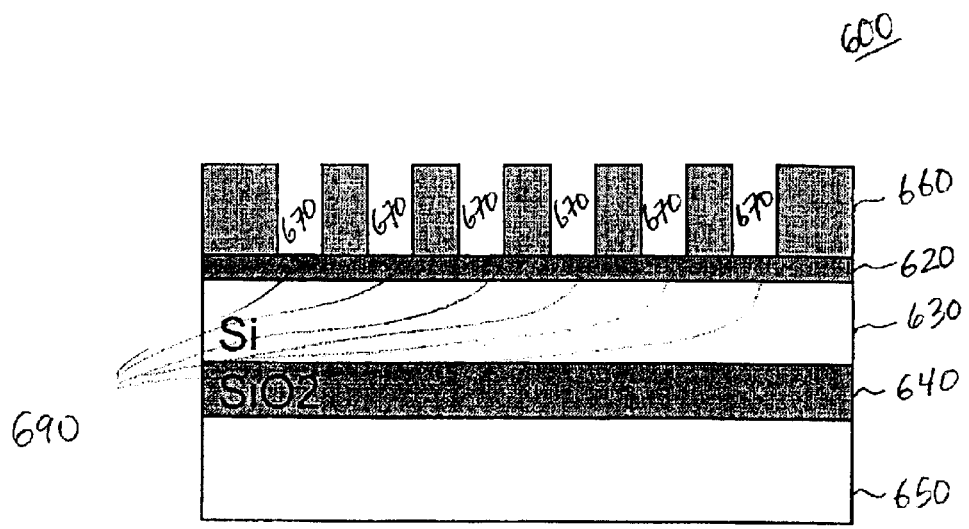
FIGS. 6A–6E illustrates an embodiment of a process involving epitaxial growth used to form an optical device such as the Bragg grating illustrated in FIG. 2 in accordance with the teachings of the present invention.

FIGS. 6A–6D illustrate another embodiment of a process involving epitaxial growth used to form an optical device such as Bragg grating 200 illustrated in FIG. 2 in accordance with the teachings of the present invention. One advantage of epitaxial growth over ion implantation may be that epitaxial growth may achieve a doping region of greater depth in a wafer. FIG. 6A is a cross-sectional view of a wafer 600 including a top insulator region 620 and semiconductor regions 630 and 650. Between semiconductor region 630 and 650 is a buried insulator region 640.

In one embodiment, semiconductor regions 630 and 650 include silicon and insulator regions 620 and 640 include silicon dioxide ($SiO_2$). In FIG. 6A, a photoresist layer 660 has been deposited over insulator region 620.

In one embodiment, photoresist layer 660 has been deposited using for example, a spin-on deposition process. As shown, photoresist layer 660 has been patterned and etched to create a series of periodic trenches 670. As in the process illustrated in FIGS. 5A–5E, a hard mask may also be used in one embodiment. In one embodiment, the patterning may be carried out using a lithographic process although other patterning processes such as ablation, ruling, or other techniques will be apparent to those skilled in the art. The etching can be carried out using either a dry or a wet process, and varieties of both wet and dry etching will be apparent to those skilled in the art and may be dependent upon the materials used for photoresist layer 660 and insulator region 620.

As shown in FIG. 6A, discrete transverse sections 690 of insulating layer 620 are exposed by the patterned photoresist layer 660. In one embodiment, insulator region 620 forms a hard mask over semiconductor substrate layer 630. Discrete sections of insulator region 620 exposed by etching appear at locations 690.

Figure 6B:
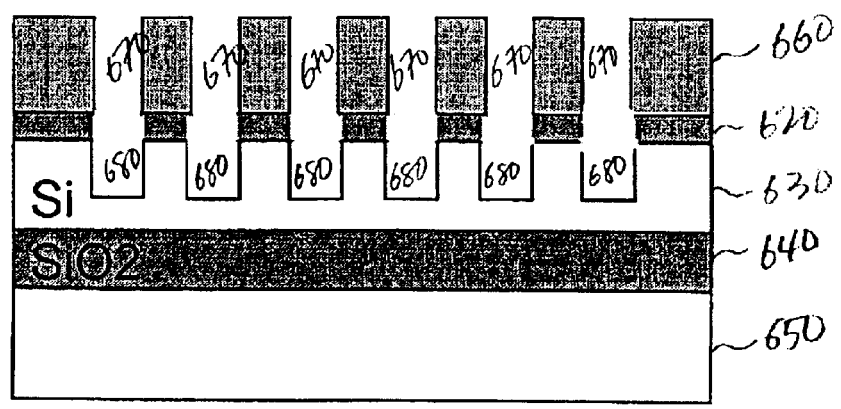

Next, as illustrated in FIG. 6B, the hard mask or insulator region 620 and semiconductor region 630 are removed by selective wet or dry etching. In one embodiment a reactive ion etch may be used. Again, a lithographic patterning process may be used and wet or dry etching processes may be used. As a result, periodic trenches are formed at locations 680. In one embodiment, trenches 680 have a depth order of ~2 μm.

Figure 6C:
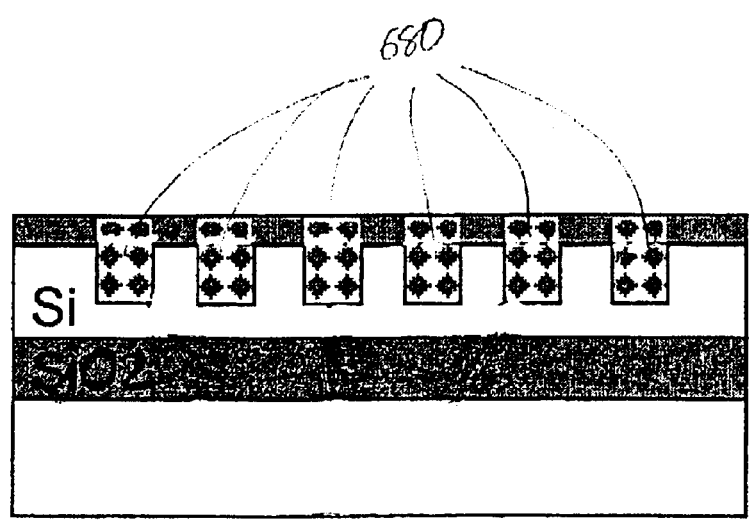
Figure 6E:
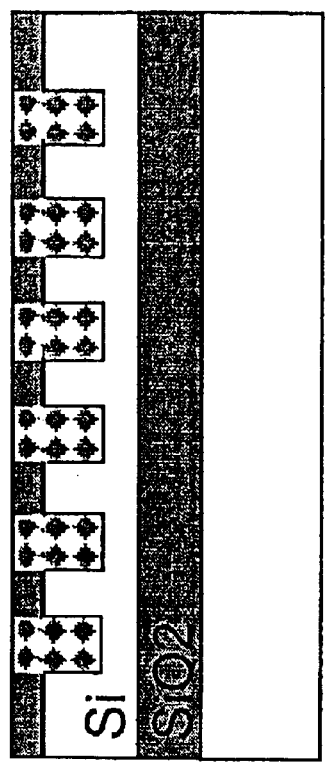
Figure 6D:
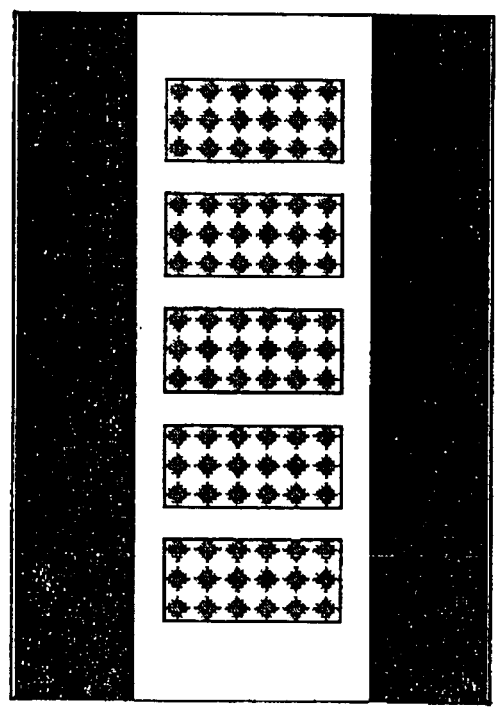

In FIG. 6C, photoresist layer 660 is removed and $Si_{1-x}Ge_x$ is epitaxially grown in trenches 680. Standard chemical vapor deposition (CVD) processes may be used to grow the $Si_{1-x}Ge_x$ in the trenches 680. Finally, in FIGS. 6D and 6E, a waveguide is patterned and etched. In one embodiment, trenches of up to ~2 μm are etched.

In the processes illustrated above in FIGS. 5A–5F and 6A–6E, semiconductor regions have included silicon as an example. It is appreciated that silicon is an example material provided for explanation purposes and that other semiconductor materials including III–V semiconductor materials or the like may be utilized in accordance with the teachings of the present invention. For instance, in one embodiment the semiconductor material includes gallium arsenide. Furthermore, in one embodiment, the dopant material may include at least one of aluminum, indium, antimony or phosphorus or other suitable material. In one embodiment the insulator regions may be an oxide such as silicon dioxide ($SiO_2$). In another embodiment, the insulator regions may include nitride or other suitable insulator.

The above embodiments of processes illustrated in FIGS. 5 and 6 illustrate a Bragg grating, however, other optical devices having low contrast and high contrast interfaces may be produced in a similar manner.

Figure 7:
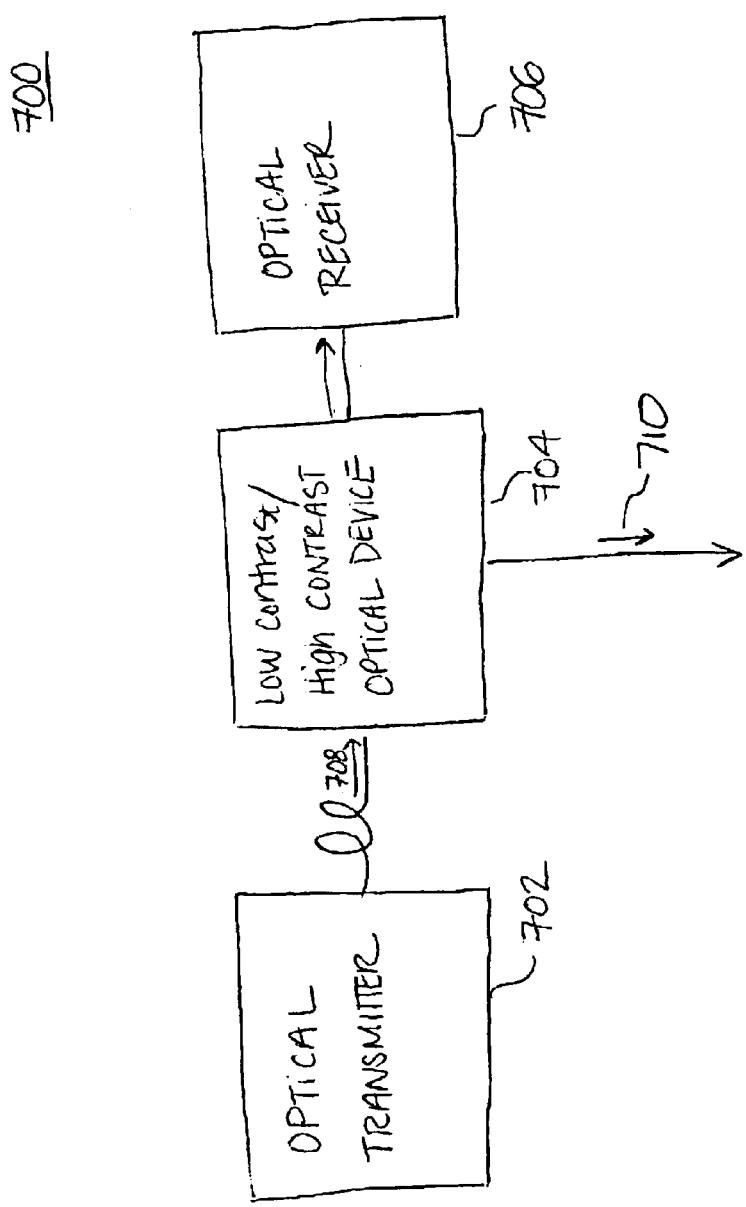
FIG. 7 is a diagram illustrating one embodiment of an optical communication system including an optical device having low and high contrast interfaces in accordance with the teachings of the present invention.

FIG. 7 is a diagram illustrating one embodiment of an optical communication system 700 including a low contrast/high contrast optical device 704 in accordance with the teachings of the present invention. In various embodiments optical device 704 may be included in a waveguide Bragg grating, a directional coupler, a ring resonator or another optical device in which low contrast and high contrast interfaces are included. In the depicted embodiment, optical communication system 700 includes an optical transmitter 702 to transmit an optical beam 708. An optical receiver 706 is optically coupled to receive optical beam 708. It is appreciated that optical transmitter 702 and optical receiver 706 may also include optical transceivers and therefore have both transmitting and receiving capabilities for bi-directional communications. In one embodiment, optical device 704 is optically coupled between optical transmitter 702 and optical receiver 706. In the illustrated embodiment, optical device 704 is shown to be at the receiving end of optical communication system 700. In other embodiments, optical device 704 may be disposed at various locations along a transmission path or at the transmitting end of optical communication system 700.

In one embodiment, optical device 704 may be included in a Bragg grating or ring resonator and be utilized in for example an add/drop filter enabling the addition or extraction of a channel from a wave division multiplexed (WDM) optical beam 708 transmitted from optical transmitter 702 along an optical path. Thus, an optical beam 710 having a specific wavelength is output from optical device 704. In another embodiment, optical device 704 may include a 3 dB coupler or directional coupler and may be used to split optical beam 708 such that a duplicate optical beam 710 is output from optical device 704 and optical beam 708 is received at optical receiver 706.

In the foregoing detailed description, the method and apparatus of the present invention have been described with reference to specific exemplary embodiments thereof. It will, however, be evident that various modifications and changes may be made thereto without departing from the broader spirit and scope of the present invention. The present specification and figures are accordingly to be regarded as illustrative rather than restrictive.

What is claimed is:

1. A system, comprising:

an optical transmitter to transmit an optical beam;

an optical receiver optically coupled to the optical transmitter to receive the optical beam; and an optical device optically coupled between the optical transmitter and the optical receiver, the optical device including a semiconductor material and having a high contrast interface and a low contrast interface, the high contrast interface defined at an interface location between the semiconductor material and insulating material included in the optical device, the low contrast interface defined at an interface location between the semiconductor material and a doped region disposed in the semiconductor material, the optical beam directed through the semiconductor material and confined to remain in the semiconductor material with the high contrast interface, the optical beam optically coupled to propagate through the low contrast interface, the optical beam to propagate through the low contrast interfaces with evanescent coupling depending on an incident angle of the optical beam relative to the low contrast interface.

2. The system of claim 1 wherein the semiconductor material includes silicon and the doped region includes silicon doped with germanium.

3. The system of claim 1 semiconductor material includes III–V semiconductor material.

4. The system of claim 1 wherein the insulating material includes at least one of oxide or nitride.

5. The system of claim 1 wherein the optical device is included in at least one of a waveguide Bragg grating, a ring resonator and a directional coupler.

* * * * *